Figure 1:
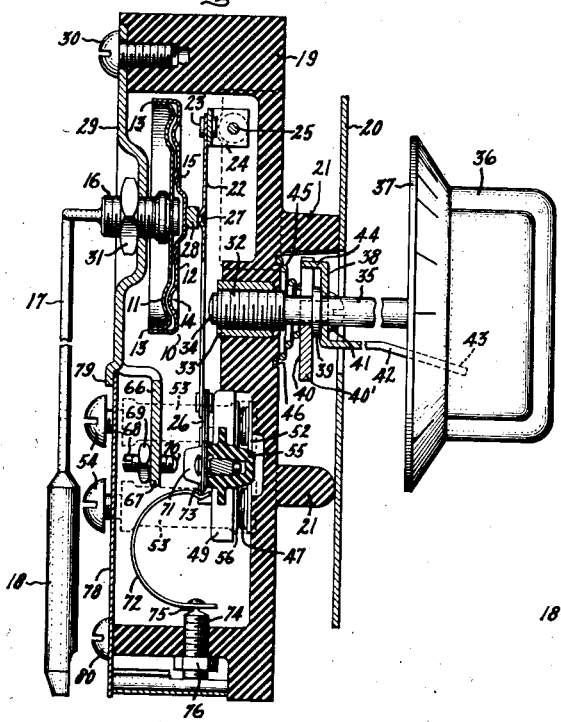

Oct. 21, 1941.   W. J. ETTINGER   2,260,014
CONTROL DEVICE
Filed June 23, 1939

Inventor:
Wallace J. Ettinger,
by Harry E. Dunham
His Attorney.

Patented Oct. 21, 1941

2,260,014

UNITED STATES PATENT OFFICE 2,260,014

CONTROL DEVICE

Wallace J. Ettinger, Chicago, Ill., assignor to Edison General Electric Appliance Company, Inc., Chicago, Ill., a corporation of New York Application June 23, 1939, Serial No. 280,758

18 Claims. (Cl. 200—140)

My invention relates to control devices and more particularly to temperature control devices for automatically maintaining a predetermined, preselected temperature.

Although not limited thereto, my invention relates particularly to means for automatically opening and closing in response to temperature changes an electrical circuit such as the heating circuit or the controlling circuit for the heating circuit of an electric oven in order to maintain a substantially constant predetermined temperature. With control devices of this character, it is essential that the controlling members shall be operated with the minimum amount of lost motion and friction between the component elements thereof in order that the device shall have its maximum sensitivity over the entire operating range and in order to eliminate erratic operation of the device.

In its primary aspect my invention contemplates the provision of an improved control device which is simple, compact, rugged, readily assembled and relatively inexpensive to manufacture.

In another of its aspects my invention contemplates a control device of the character described having relatively few operating parts and having these parts constructed and arranged to produce the controlling function with a minimum of frictional restraint.

My invention further contemplates the provision of a new and improved control device having relatively few component parts and having these parts constructed and arranged to eliminate erratic switch action and materially increase the overall sensitivity of the device.

My invention further contemplates the provision of a new and improved control device having the component elements thereof constructed and arranged so that they are subjected to the minimum of stress under all operating conditions.

My invention also contemplates the provision in my improved control device of improved means for preselecting and adjusting the temperature at which my improved control device operates, said means being operable to provide a positive off position for said control device at room temperature.

My invention further contemplates the provision in my improved control device, when it is used in controlling an electric circuit, of a double-pole fixed contact structure and new and improved means for simultaneously bridging the fixed contacts.

My invention further contemplates the provision in my improved control device of simplified means for compensating for the effect of ambient temperature variations.

In accordance with my invention in one form thereof a temperature control device is provided having an operating member which is pivotally mounted in a suitable casing so that one end is fixed and its opposite end is free to move to actuate a control member associated therewith. Adjustably mounted in the casing is an adjusting means which is adapted to be engaged by the operating member. Also mounted in the casing is an operating member, such as a thermally actuated device which is adapted to engage the operating member and cause it to move in response to temperature changes. The elements just dscribed are so arranged that movement of the thermally actuated device is transmittd to the operating member which in turn is moved into engagement with the adjusting means and is caused to pivot thereabout. This pivoting of the operating member effects movement of the free end thereof to actuate the control member. Resilient means are provided to cause the control member to be actuated with a snap action. In addition, means are provided for compensating for ambient temperature variations. In order to obtain different settings of the control device it is merely necessary to move the adjusting means relative to the operating member.

Figure 2:
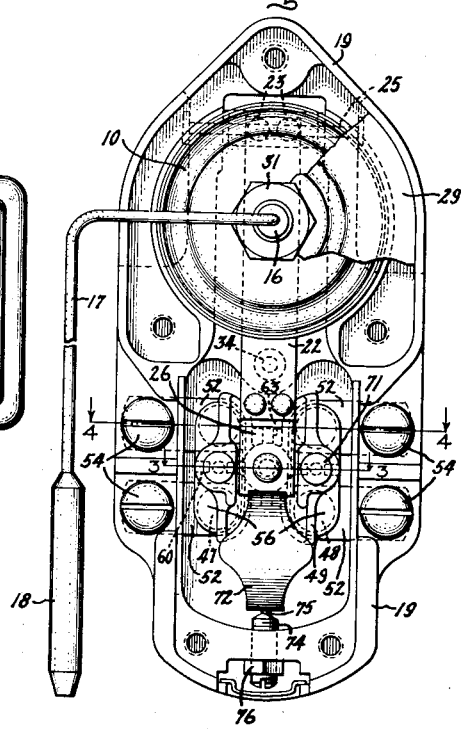
Figure 5:
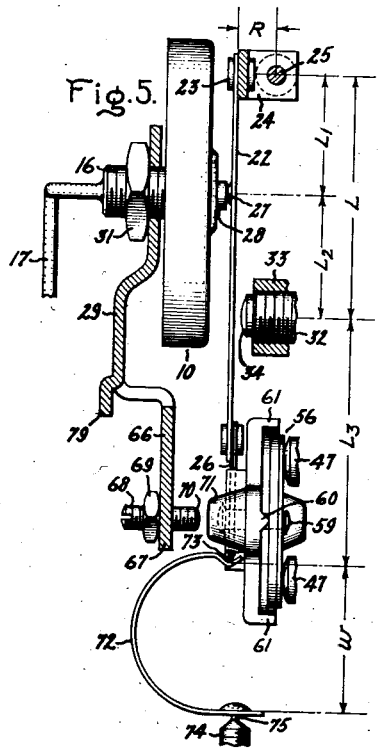
Figure 3:
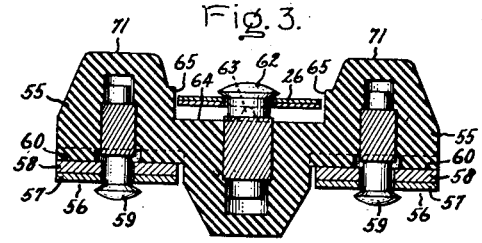
Figure 4:
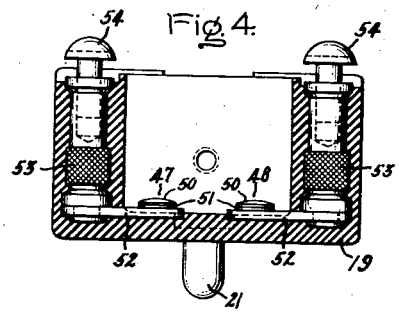

For a more complete understanding of my invention reference should be had to the accompanying drawing in which Fig. 1 is a side elevation mainly in section of a temperature control device arranged in accordance with my invention; Fig. 2 is a rear view in elevation of the temperature control device illustrated in Fig. 1; Fig. 3 is an enlarged sectional view taken on the line 3—3 of Fig. 2 showing details of the movable contact structure; Fig. 4 is a sectional view taken on the line 4—4 showing details of the fixed contact structure, the movable contact being removed; and Fig. 5 is an enlarged fragmentary view showing the essential operating elements of the control device illustrated in Fig. 1.

While throughout the following description reference will be made to the application of my control device as a temperature regulator for an electric oven, it is to be understood that the control device of this invention has general application and may be used to control other devices such as frying kettles, refrigerators, and many other types of heated or cooled devices wherein it is desirable to hold a substantially constant preselected temperature. In addition, it is to be understood that my invention is not limited in its application to electrically heated devices but may also be readily modified and used to control the flow of fuel in other types of devices, such as gas ovens and the like.

The temperature control device of my invention is of the type in which a thermally actuated device actuates a member which performs a controlling function. In the preferred form of my invention the thermally actuated device is in the form of a hydraulically operated thermal motor of the type in which an expansible and contractible member is moved in response to expansion and contraction of a fluid in accordance with temperature changes, this movement being utilized to operate a member to control a supply of heat to the space whose temperature is being controlled. In applying control devices of this character to domestic appliances and particularly to ranges, an important consideration is space limitations. It is, therefore, desirable to have a control device which is as compact as possible. In accordance with my invention I have provided a control device in which the expansible and contractible element comprises a diaphragm unit which effects a considerable saving in space over the usual bellows type of expansible unit.

Referring to Fig. 1, the diaphragm unit is designated by the numeral 10. Any suitable diaphragm unit may be employed but in the preferred form of my invention I use a diaphragm unit of the type described and claimed in the copending application Serial No. 280,764 (D-61,-975) of Samuel G. Eskin, filed June 23, 1939, assigned to the assignee of the present invention. Briefly, the diaphragm unit 10 comprises two cup-like members 11 and 12 arranged in telescoping relation and hermetically sealed together at their edges 13, one or more circumferential corrugations 14 being provided in the cup members to improve the operating characteristics of the unit. In order to maintain a definite space relation between the cup members 11 and 12, a plurality of bosses 15 is provided in the upper cup member 12.

Arranged centrally of the bottom cup member 11 there is provided a nipple 16 hermetically sealed into the wall of the cup member 11. Sealed in the end of the nipple 16 is one end of a suitable length of tubing 17 and provided at the opposite end of the tubing 17 is a bulb 18 which is adapted to be located in the medium being controlled. The diaphragm unit 10, the nipple 16, the tube 17 and the bulb 18 form a closed system which is filled with a suitable thermally responsive liquid having a relatively high coefficient of expansion and the property of retaining its liquidity throughout normal operating temperatures in the space being heated. The closed system charged with the thermally responsive liquid provides a hydraulic thermal motor which is adapted to produce mechanical movement in response to temperature changes to which the bulb 18 is subjected. The bulb 18 is, of course, suitably positioned within the chamber the temperature of which is to be controlled, for example, the oven of a range.

As illustrated in Figs. 1 and 2 a substantially rectangular shaped casing 19 having one side open to permit unrestricted access to the interior thereof is provided for supporting the component elements of my improved control device. The casing 19 may be made of any suitable insulating material but a suitable phenolic condensation product having an asbestos filler is preferred due to its permanence of dimensions and its resistance to arcing and burning. The casing 19 is adapted to be mounted by suitable means (not shown) to a wall 20 of the device being controlled, e. g. the wall 20 may represent a portion of the front wall of a range adjacent the control knobs for the surface units of the range. The integrally formed studs 21 are adapted to space the casing 19 from the wall 20.

Pivotally mounted in the casing 19 of the temperature control device is a resilient operating arm 22. This arm 22 is firmly attached at one end by means of rivets 23 to a bracket 24 which is arranged to pivot about the pin 25 mounted in the Bakelite casing 19. Provided on the free end of the resilient operating member 22 is a short length of suitable bimetallic material 26 which operates as an ambient temperature compensating element in a manner to be more fully described hereinafter.

Provided in the operating member 22 adjacent the fixed end thereof is a boss 27 which is located so as to be engaged by a stud 28 provided on the central portion of the upper cup-like member 12 of the diaphragm unit. While an integrally formed boss centrally located in the upper plate might be used in place of the solid stud 28, the latter construction is preferred in order to prevent deformation which might result with a formed boss from the restraining forces applied by the operating member 22. The stud 28 and the boss 27 are arranged to be in engagement throughout the entire range of operation of the control device. In order to effect the initial adjustment of the diaphragm unit 10 so as to bring the stud 28 into engagement with the boss 27, the nipple 16 is provided with an external thread to permit it to be threadedly mounted on the supporting plate 29 which is firmly secured to the casing 19 by means of screws 30. By means of the threaded relation between the nipple 16 and the plate 30, the diaphragm unit is adjustably mounted in the casing 19. When the diaphragm unit 10 is properly adjusted with reference to the operating member it is firmly locked in position by means of lock nut 31.

By means of the arrangement described thus far it will be observed that expansion and contraction of the fluid in the thermal motor causes expansion or contraction of the diaphragm unit. This in turn causes a deflection of the operating member 22 about its pivot 25. In order to control the deflection of the member 22 so that it will perform a switching operation and in order to provide means for adjusting the temperature at which the operating member performs its switching function, an adjusting screw 32 is provided which is threadedly supported in a sleeve 33 mounted in the casing 19. Provided on the end of the adjusting screw 32 is a rounded portion 34 which is adapted to engage, or be engaged by, the operating member 22 at a point intermediate the boss 27 and the free end of the operating member. The adjusting screw 32 is provided with a shaft 35 which is adapted to extend outside of the casing 19 to receive a suitable control knob 36. Any suitable means may be employed for attaching the knob 36 to the shaft 35 in a manner to insure the proper relation of the indicia 37 on the knob to the actual operating condition of the controlled appliance. In the preferred form of my invention I employ the means described in the copending application of Raymond L. Coultrip, Serial No. 217,700, filed July 6, 1938, now Patent No. 2,179,281, and assigned to the assignee of the present invention.

To effect a positive driving connection between the knob 36 and the shaft 35 there is provided an operating member in the form of a disk 38 which is slid on the shaft 35 and lies between the knob 36 and a collar 39 integral with the shaft. The driving connection between the disk 38 and the shaft 35 is obtained by means of a friction clamp formed by the disk 38, a plate 40, and a pair of screws 41, the disk, plate and screws being arranged to tightly clamp the collar between them. Provided on the disk 38 is an outwardly extending lug 42 arranged generally at right angles to the disk and having a free end 43 which is adapted to be inserted in the knob 36 to form the driving connection between the knob and the disk.

The plate 40 is provided with an outwardly projecting portion 40' which is adapted to engage the stud 21 when the shaft is rotated a predetermined amount to limit the movement of the adjusting screw in either the clockwise or counterclockwise direction. In order to prevent relative movement between the plate 40 and the disk 38 and to maintain a definite relation between the two members, the plate 40 is slotted and a lug 44, which is adapted to extend into this slotted portion, is provided on the disk.

Interposed between the plate 40 and the casing 19 is a flattened coiled spring 45 having an end which lies in a groove 46 provided in the casing 19. This spring serves to take up any play existing in the threaded connection of the adjusting screw and also serves to maintain the knob 36 in its adjusted position.

Considering the details described thus far, it is apparent that rotation of the knob 36 will cause the end 34 of the adjusting screw to be moved closer to or farther from the operating member 22. Assuming that the adjusting screw 32 is rotated so that the rounded end 34 is spaced a predetermined distance from the operating member 22, then expansion of the diaphragm unit 10 in accordance with an increase in temperature will first cause the operating member 22 to pivot about the pivot point 25 until it engages the end 34 of the adjusting screw. Further expansion of the diaphragm unit causes the operating member to be pivoted about the end 34 of the adjusting screw as a fulcrum, this pivotal movement causing an opposite deflection of the free end of the operating blade—a deflection to the left as viewed in Fig. 1—which deflection is utilized to perform a controlling function. It is thus apparent that the position of the rounded end 34 relative to the operating member determines the temperature at which the device performs its controlling function.

As previously mentioned, the regulator of my invention is used to control the temperature within the oven of an electric range. The control member is, therefore, an electric switch and in this case is a double-pole switch comprising two pairs of fixed contacts 47 and 48 with which a movable bridging contact assembly 49 cooperates. As shown in Fig. 4, the fixed contacts 47 and 48 consist of contact surfaces 50 of precious metal mounted on a steel backing strip 51 which are welded to conducting strips 52. These conducting strips 52 are riveted to studs 53 which are molded in the side walls of the casing 19. Provided in the outside end of the studs 53 are threaded recesses into which are threaded screws 54 which are adapted to firmly hold in place suitable conductors connected in the heating circuit. Each pair of fixed contacts is bridged by a bridging contact member and when the bridging contact member is removed from the fixed contacts both sides of the line of the heating circuit are open circuited.

The bridging contact assembly 49 is carried by the bimetallic compensating strip 26 mounted on the free end of the operating member 22 and comprises, as illustrated in Figs. 2 and 3, an insulated carrier member 55 upon which are mounted bridging contact blades 56. Each of the contact blades 56 consists of a layer of precious metal 57, such as silver, mounted on and brazed to a base or carrier portion 58 of bronze.

In accordance with one aspect of my invention, the assembly 49 is arranged to provide a free floating bridging contact having two degrees of freedom which arrangement has been found desirable for bridging simultaneously the two pairs of fixed contacts provided in the double-pole switch structure. The free floating arrangement is obtained through, and depends upon, the manner in which the insulating support 55 is mounted on the blade 26 and the manner in which the contact elements 56 are mounted on the support 55. The contact blades 56 are attached to the supporting block 55 by means of drive screws 59. A V-shaped projection 60, shown most clearly in Fig. 5, is provided in the block 55 so as to form a knife-edge about which the blade 56 may be rotated in one plane. To prevent the rotation of the blade 56 in any other plane, the supporting block 55 is provided with raised portions 61, Fig. 5. In addition, the under surfaces of the heads of the drive screws 59 are rounded in order to permit rotation of the blades 56 with a minimum of play or lost motion in the one plane in which they are free to move. The block 55 is attached to the bimetallic blade section 26 of the operating member by means of a drive screw 62. Here again a V-shaped projection 63, shown in Fig. 3, is provided on the insulated block to permit rotation of the block in a plane at right angles to the plane of rotation of the blades 56 and in order to prevent rotation of the block in all other planes it is provided with a recess 64 having flat side wall portions 65. The under surface of the drive screw 62 is also rounded in order to permit rotation with a minimum of play and lost motion. By means of this construction of the movable contact assembly, it is to be observed that the movable contact is free to rotate in two planes at right angles to each other. This provides two degrees of freedom for the bridging contact assembly and permits the fixed contacts of the double-pole contact arrangement to be simultaneously bridged thereby preventing pitting or chattering of the contact elements during either circuit closing or circuit opening operations.

In order to limit the movement of the bridging contact assembly 49 when it is moved to its circuit opening position, the diaphragm supporting plate 29 is provided with an integral offset portion 66. The offset portion 66 is substantially U-shaped and provided at each corner 67 of the U portion is an adjustable stud 68 adapted to be locked in adjusted position by a nut 69. By loosening the nut 69, the stud may be screwed inwardly or outwardly to vary the position of the end 70. Abutments 71 are provided on the block 55 and these are arranged to engage the ends 70 to the adjustable stop screws 68 to limit the movement to the left, as viewed in Fig. 1, of the bridging contact.

In the preferred form of my invention, the operating member 22 is adapted to move quickly from one position to another so as to perform the switching functions with a snap action. In order to accomplish this, the free end of the operating blade 22 is subjected to a force or end thrust by means of a pivoted U-shape spring 72. The spring 72, as shown in Fig. 1, has one arm bearing on the knife-edge 73 provided on the end of the bimetallic blade section 26 which is attached to the free end of the operating member 22. The other arm of U-spring 72 bears on a fixed pivot 74 mounted opposite the knife-edge 73. The pivot 74 comprises a stud which is threadedly engaged in an end wall of the casing 19. By means of the threaded stud, the location of the pivot point 75 may be adjusted and a nut 76 is provided for locking the stud in its adjusted position. This adjustment is a factory adjustment and is provided for the purpose of initially setting the end thrust so that the switch opens and closes with good snap action.

In Fig. 5, I have shown a somewhat enlarged view of the operative portions of my improved temperature control device. It is apparent that the overall length of the switch, that is, the operating blade length plus the U-spring span, is limited by the space provided for the switch on the electric range. The magnitude of these dimensions is determined by the position of the adjusting screw 32 as limited by the space on the range available for the switch. As indicated in Fig. 5, the adjusting screw position fixes the blade section lengths L and $L_3$ and the position of the boss 28 in the operating member 22 establishes the blade sections $L_1$ and $L_2$. It has been found by analysis and test that a maximum deflection of the operating member, when subjected to stresses within the safe stress limit, is obtained when the boss 28, which is engaged by the stud 29 of the diaphragm unit, is centrally located, that is, when the lengths $L_1$ and $L_2$ are equal. It has also been found that the force reaction of the operating member on the diaphragm is a minimum when $L_1$ and $L_2$ are equal. While in general best switch action is obtained with this preferred relation, it is to be understood that the control device will operate if the point of contact of the stud 22 is moved either to the right or to the left of the mid position which has just been discussed. In such an instance, however, the switch sensitivity will be decreased and the reaction force of the bar on the diaphragm will be increased.

As previously mentioned, the operating member 22 is relatively thin and resilient. Its thickness must be such that it will not be overstressed when the switch is operating at the high heat setting and the adjusting screw is suddenly turned to a low heat setting or the off position. Any decrease in thickness beyond this optimum thickness is undesirable because the U-spring force is decreased and the switch stability is lowered.

The U-spring span W is determined by a theoretical relationship between the effective blade length $L_3$ and the span which results in maximum switch sensitivity. Because the operating blade 22 is necessarily thin and an increase in span requires an increase in end thrust for a predetermined sensitivity, it has been found desirable to provide a span of one-half that of the blade length $L_3$. While in general the best switch action is obtained with this preferred relation, it is to be understood that the control device will operate if the span is varied from this optimum value.

In initially adjusting the operating portions of the switch, the members are arranged so that when the adjusting screw 32 and the stud 28 of the diaphragm unit are not in contact with the operating member 22 the electrical contacts are in the opened position. This is accomplished by positioning the pin 25, which provides for rotation of the operating member 22, a distance R (Fig. 5) above the operating member so that an imaginary line defined by the pin 25 and the bearing surface 75 of the stud 74 will lie above the knife-edge 73. Under these conditions, the end thrust provided by the U-spring 72 rotates the member 22 in a clockwise direction, as viewed in Fig. 1, about the pin 25 which serves to maintain the electrical contacts in open position. To close the contacts, the diaphragm unit is adjusted to the right by screwing the nipple 16 inwardly with reference to the supporting plate 29 an amount sufficient to cause the member 22 to be moved to the right to close the contacts. This means of obtaining the initial closed contact condition is preferred for the initial stress in the operating blade is then a minimum. When the diaphragm unit has been adjusted to its proper position the nut 32 is tightened to lock the unit in its adjusted position.

As previously mentioned, the casing 19 is provided with an open side to facilitate making initial adjustments. The plate 29 forms a closure for approximately one-half of this side. In addition to the plate 29, there is an additional cover plate 78 which forms a closure for the remainder of the opening. One end of the cover plate 78 is adapted to be inserted under lugs 79 integrally formed in the supporting plate 29. The opposite end of the cover plate 78 is firmly secured to the casing 19 by means of screws 80.

With the operating member positioned in this manner, the control device is in condition to regulate the temperature of an enclosed space. The bulb 18 is located within the space which is being heated and the casing 19 is mounted in some convenient location. In an electric range, the bulb 18 is located in the oven and the control device is located adjacent the controls for the surface units of the range. Upon an increase in temperature in the oven, the fluid in the bulb 18 expands and causes the diaphragm unit 10 to expand. Through the contact of the stud 28 on the boss 27 the operating member 22 is moved to the right, as viewed in Fig. 1, pivoting about the point 25. Depending upon the setting of the adjusting screw 32, the operating member will have a predetermined amount of free movement to the right until it contacts the rounded end 34 of the adjusting screw. When this occurs, additional expansion of the diaphragm causes the operating member to be rotated about the end of the adjusting screw as a fulcrum. Thus further deflection of the operating member to the right causes a deflection of the operating member to the right causing a deflection to the left of the free end of the operating member. When a predetermined amount of energy is stored up through the knife-edge 73 in the U-spring 72, the U-spring causes the end of the operating member to be moved quickly to the left thereby opening the switch contacts, the movement to the left of the operating member and its associated bridging contacts being limited by the stops 70.

As previously mentioned, my improved control device may be adjusted to maintain any predetermined temperature within its range by adjusting the position of the rounded end 34 of screw 32. To gain a clear understanding of how this temperature adjustment is effected, it is helpful to study the changes which occur in contact pressure and the factors which produce these changes. In my control device at room temperature the initial contact pressure is independent of any setting of the dial 36 above room temperature for it depends only on the initial pressure of the stud 28 of the diaphragm unit on the operating member 22. With the dial 36 set above room temperature, a space is normally present between the rounded end 34 of the adjusting screw 32 and the surface of the operating blade. This space is increased as the dial knob 36 is rotated clockwise and it becomes a maximum at the high temperature setting of the control device. As the temperature of the bulb in the oven rises, the diaphragm 12 is deflected to the right, as viewed in Fig. 1, resulting in a curvature to the right of the operating member and an increase in contact pressure until the operating blade movement is limited by the rounded end 34 of the adjusting screw. The contact pressure then reverses and decreases rapidly to zero as the member 22 pivots about the adjusting screw at 32 until snap occurs, and the electrical circuit is broken. It is evident, therefore, that the temperature adjustment is effected by controlling the contact pressure stored up by the operating member 22 and then released by positioning the rounded end 34 of the adjusting screw 32 relative to the surface of the same.

The normal range of movement of the adjusting screw 32 is from a predetermined high temperature setting corresponding to a maximum spacing of the end 34 from the resilient operating member 22 to a room temperature setting corresponding to engagement of the rounded end 34 with the operating blade 22 when the latter is in its position corresponding to the room temperature condition of the thermal motor. With devices of the type described, it is desirable to provide an off position, i. e. a position in which the switch contact will be held in its open position. To provide such an "off" position for my improved control device, the adjusting screw 32 is arranged so that it can be rotated, in the direction to reduce the temperature setting, a slight amount beyond the normal low or room temperature setting, thereby in effect obtaining a temperature setting below room temperature. This abnormal movement of the adjusting screw 32 causes the end thereof to move against the operating member and deflect it to the left, as viewed in Fig. 1, the operating member pivoting about the point of contact between the stud 28 on the diaphragm unit and the boss 27 in the member 22. The deflection of the operating member is sufficient to store an amount of energy in the member 22 to counteract the initial or room temperature contact pressure between the fixed and movable contacts. Hence, the contact pressure decreases rapidly to zero as the member 22 pivots until finally snap occurs under the influence of spring 72 and the contacts are opened. The contacts will remain in this open condition for all normal temperatures of the control device and it has been found that due to the close nesting of the component elements 11 and 12 of the diaphragm unit, the adjusting screw 32, and hence the knob 36, does not have to be set much below room temperature to permanently open the switch elements of the control device.

As previously indicated, the control device of my invention is adapted to be mounted adjacent the controls for the surface units of the electric range. In such a position, the control is subjected to wide variations in ambient temperature. In addition, it has been found that even though the control is not located adjacent the surface units, wide fluctuations in ambient temperature will occur due to the varying conditions under which the range is operated. For example, a range used in a kitchen in Maine will be subjected to an ambient temperature which is considerably lower than a range used in Texas. The localized heating of the liquid in the diaphragm unit due to variations in ambient temperature causes the liquid to expand and unless this expansion of the liquid were compensated for it would cause a false movement of the operating member which would cause the associated contacts to be opened sooner than they should. In other words, this expansion of a liquid due to ambient temperature conditions causes the control device to cut off the supply of heat to the oven or heated space before the desired temperature is obtained. In order to compensate for this effect of ambient temperature changes, the short strip 26, formed of a piece of bimetal comprising two strips of metal having dissimilar temperature coefficients of expansion and being securely welded together, is provided. The strips may be formed of nickel chrome steels of the proper compositions. The bimetal element 26 is so arranged that when the ambient temperature increases and thus the fluid in the diaphragm expands, the bimetal strip will curve toward the left, as viewed in Fig. 1, so as to counteract the movement of the operating member to the right. Upon a decrease in ambient temperature, the bimetal strip moves in the opposite direction to counteract movement of the operating member to the left.

From the foregoing description it will be seen that I have provided a temperature control device which is of a simple and rugged construction having relatively few elements and relatively few connections offering frictional restraint to the movement of the elements. In addition, I have provided a control device which may readily and simply be adjusted over a range varying from a predetermined high temperature to an off position. Obviously, though I have disclosed and described a diaphragm type of hydraulically operated thermal motor as the thermally actuated element of my improved control device, because of the conservation of space resulting from the use of such an element, it will be understood that any other suitable compact hydraulically operated thermal motor may be employed or any other thermally actuated device capable of producing a large force with a small deflection may be used.

While I have described and illustrated one embodiment of my invention as applied to electric range control, it is apparent that my improved control device is susceptible of modification and more general application. I, therefore, intend in the appended claims to cover all modifications and applications within the true spirit and scope of my invention.

What I claim as new and desire to secure by Letters Patent of the United States, is:

1. In a temperature control device, a pivotally mounted resilient operating member, control means actuated by said operating member, a hydraulically operated thermal motor engaging said operating member so as to cause movement thereof in response to temperature changes, fulcrum means adapted to be engaged by said operating member to effect the movement of said operating member so that said control means is actuated at a predetermined temperature, and means for adjusting said fulcrum means in the plane of movement of said operating member to very said temperature at which said control means is actuated.

2. A temperature control device comprising a casing, a resilient operating member pivotally supported at one end in said casing and having its opposite end free to move, a control device associated with said free end, a hydraulically operated thermal motor associated with said operating member and adapted to move said operating member in response to temperature changes, and adjustable means mounted in said casing so as to be normally spaced from said operating member but adapted to be engaged thereby at a point intermediate said pivoted end and said free end of said member, said adjustable means forming an adjustable fulcrum about which said operating member may be rotated by said thermal motor to actuate said control device at a predetermined temperature which depends upon the position of said adjustable means relative to said operating member.

3. In a control device adapted to control a heat source in response to temperature variations in a space being heated, a resilient operating member pivotally mounted at one end having its opposite end free to move, a control means associated with said operating member adjacent its free end, a fulcrum normally spaced from said operating member but adapted to be engaged thereby at a point intermediate said pivoted end and said free end, thermally responsive means adapted to engage said operating member midway between said pivoted end and the point of engagement of said adjustable fulcrum, said thermally responsive means causing said operating member to rotate about its pivoted end until it is moved into engagement with said fulcrum and to thereafter move about said fulcrum to actuate said control means in accordance with temperature changes above and below a predetermined temperature, and means for varying the position of said fulcrum relative to said operating member for predetermining the temperature at which said control member functions.

4. A temperature regulator for a space to be heated comprising the combination of a casing, a resilient operating member pivotally mounted at one end in said casing and having its opposite end free to move, control means associated with said free end, a bulb adapted to be mounted in said space, a diaphragm unit adjustably mounted in said casing, a tube connecting said bulb and diaphragm unit to form a closed system, a liquid temperature responsive fluid in said system and adapted to cause expansion and contraction of said diaphragm unit in response to temperature changes in said space, means attached to said diaphragm unit and engaging said operating member whereby said member is moved in response to temperature changes, and adjustable fulcrum means normally spaced from said operating member and adapted to be engaged by said operating member on the side opposite said diaphragm unit so that the movement of said operating member in response to temperature changes is effected to cause said control means to be operated at a predetermined temperature.

5. In a control device, a casing, a resilient operating member pivotally mounted at one end in said casing and having its opposite end free to move, control means associated with said operating member, a diaphragm unit adapted to expand and contract in response to temperature changes, means for transmitting the movement of said diaphragm unit to said operating member so that said member is moved in response to temperature changes to actuate said control means, adjustable fulcrum means associated with said operating member on the side opposite said diaphragm unit and spaced from said diaphragm unit in the direction of the free end of said operating member, said adjustable fulcrum means being adapted to be engaged by said operating member so that the movement thereof in response to temperature changes is restricted causing said control means to be operated at a predetermined temperature, and means for adjusting the position of said fulcrum with respect to said operating member to control the temperature at which said control means are operated, said last mentioned means being movable to a position which produces an off condition of said control means at normal temperatures.

6. In a temperature control device, a casing, a relatively thin, resilient operating member pivotally mounted at one end in said casing and having its opposite end free to move, an adjustable fulcrum threadedly mounted in said casing and adapted to be engaged by said operating member, a plurality of fixed contacts in said casing, a bridging contact associated with said operating member and adapted to cooperate with said fixed contacts to perform a switching function, resilient means associated with said operating member for causing said cooperating contacts to perform their switching function with a snap action, a hydraulically operated thermal motor mounted in said casing and adapted to engage said operating member intermediate the pivoted end of said member and the point of contact of said adjustable fulcrum, movement of said thermal motor in response to temperature changes producing pivotal movement of said operating member about said pivoted end until said member engages said fulcrum and thereafter causing said member to pivot about said fulcrum to move said bridging contact so as to perform a switching function, and means for adjusting the position of said fulcrum relative to said operating member to control the temperature at which said switching functions are performed.

7. In a control device, a casing, a resilient operating member pivotally mounted in said casing and having one end free to move, a diaphragm unit mounted in said casing, a bulb adapted to be remotely located in the space the temperature of which is to be controlled and connected to said diaphragm unit by a tube so as to form a closed system, a thermally responsive liquid in said closed system the expansion and contraction of which cause the expansion and contraction of said diaphragm unit, means for transmitting the movement of said diaphragm unit to said operating member so as to cause said member to pivot in said casing, fulcrum means normally spaced from said operating member on the side opposite said diaphragm unit for effecting the pivotal movement of said operating member so as to cause a reverse deflection of the free end thereof upon continued movement of said operating member about its pivotal connection to said casing, control means associated with the free end of said operating member and adapted to be actuated by said reverse deflection of said free end, and means for varying the position of said fulcrum means relative to said operating member for controlling the free movement of said member before it engages said fulcrum means.

8. In a temperature control device for an oven having an electric heating circuit, a casing, an operating member pivotally mounted at one end in said casing and having its opposite end free to move, a boss provided in said operating member adjacent said pivoted end, a diaphragm unit having upper and lower cup-like members hermetically sealed together adjustably mounted in said casing below said boss, a stud centrally located in said upper cup member and arranged to engage said boss in said operating member, a bulb adapted to be mounted in said oven, a tube connecting said bulb and diaphragm unit to form a closed system, a temperature responsive fluid in said bulb, tubing, and diaphragm unit adapted to cause expansion and contraction of said diaphragm unit in response to temperature changes to which said bulb is subjected and to thereby cause movement of said operating member about its pivoted end, a short bimetallic element mounted on the free end of said operating member and arranged to compensate for movement of said member by said diaphragm unit due to the effect of ambient temperature conditions on said fluid, a double-pole bridging contact assembly mounted on said bimetallic element, a plurality of fixed contacts mounted in said casing and adapted to be bridged by said bridging contact assembly and thereby form a control switch in the heating circuit of said oven, resilient means associated with said bimetallic element for actuating said switch means between its circuit opening and circuit closing positions quickly and with a snap action, an adjusting screw threadedly mounted in said casing and having one end extending outside of said casing and its other end within the casing and normally spaced from said operating member, said end of said adjusting screw within said casing being adapted to be engaged by said operating member to form a fulcrum about which said operating member pivots to actuate said switch means at a predetermined temperature, and means for adjusting the end of said adjusting screw relative to said operating member to control the temperature at which said switch means are actuated.

9. In a temperature control device, a resilient operating member pivotally mounted at one end and having its opposite end free to move and being constrained intermediate said pivoted end and said free end by two fulcrums laterally spaced from each other one of which is movable in response to temperature changes, pivotally mounted elastic means bearing on said free end of said operating member and arranged to subject said operating member to a force to cause the unconstrained portion thereof to move quickly and with a snap action between two limiting positions, said snap action movement occurring upon a predetermined movement of said one fulcrum in response to temperature changes.

10. In a temperature control device, a resilient operating member pivotally mounted at one end and having its opposite end free to move, control means associated with said free end of said operating member, temperature responsive means adapted to engage one side of said operating member intermediate its ends, an adjusting screw adapted to engage the opposite side of said operating member intermediate said free end and the point of engagement of said temperature responsive means and constructed and arranged to cooperate with said temperature responsive means to constrain said operating member, pivotally mounted elastic means bearing on said free end of said resilient operating member, said elastic means being constructed and arranged to subject said operating member to a force to cause said free end thereof to move between two limiting positions quickly in response to predetermined movement of said temperature responsive means so that said control means are actuated with a snap action.

11. In a temperature control device, a resilient operating member pivotally mounted at one end having its opposite end free to move and being constrained intermediate said pivoted end and said free end by two fulcrums one of said fulcrums comprising hydraulically operated thermally responsive means of the diaphragm type and the other of said fulcrums comprising an adjusting screw adjustable with respect to said operating member, said fulcrums being laterally spaced and said fulcrum formed by said temperature responsive means lying adjacent said pivoted end of said operating member, pivotally mounted elastic means bearing on said free end of said resilient operating member and constructed and arranged to subject said operating member to a force to cause the unconstrained portion thereof to move quickly and with a snap action between two limiting positions upon a predetermined movement of said fulcrum formed by said thermally responsive means, and means for adjusting said adjusting screw to vary the amount of movement of said thermally responsive means required to cause said snap action.

12. In a temperature control device having a casing one side of which is open, a resilient operating member pivotally mounted in said casing and adapted to be moved to actuate switch means between a circuit opening and circuit closing position, an expansible and contractible diaphragm unit arranged in said casing so as to cause movement of said operating member in response to temperature changes, means for adjustably supporting said diaphragm unit in said casing, said means comprising a diaphragm supporting plate firmly mounted on said casing and adapted to substantially cover said open side thereof, lugs integrally formed on said diaphragm supporting plate and extending within said casing, said lugs adapted to cooperate with said operating member to limit the movement thereof in the direction causing said associated switch means to move to the open circuit position.

13. In a temperature control device adapted to be actuated in accordance with movement of a hydraulically operated thermal motor having a diaphragm type of expansible and contractible element, a casing for enclosing the operative elements of said temperature control device and having one side thereof open; means for adjustably supporting said diaphragm unit in said casing, said means comprising a plate upon which said diaphragm unit is threadedly mounted, said plate being firmly attached to said casing and constructed and arranged so as to substantially cover the open side thereof, and a second plate cooperating with said supporting plate to completely cover said open side.

14. In a temperature control device a double-pole fixed contact structure, a resilient operating member, a movable bridging contact assembly attached to said operating member and constructed and arranged to have two degrees of freedom so as to simultaneously bridge said fixed contacts when moved into circuit closing position by said operating member, said assembly comprising an insulating support having an upper and lower face, a pair of walls on said lower face defining a recess arranged to receive said operating member, a boss arranged in said recess to permit pivotal movement of said support in one direction relative to said operating member, said walls of said recess preventing movement of said support in all other directions relative to said operating member, a pair of walls on said upper face of said support defining a pair of recesses, bosses extending transversely of each of said second mentioned recesses, contact plates mounted in said second mentioned recesses and arranged to pivot about said bosses, said second-mentioned walls forming stops to limit the movement of said plates to only pivotal movement about said transversely extending bosses.

15. A temperature control device comprising a relatively thin resilient operating member pivotally mounted at one end and having its opposite end free to move, control means associated with said free end of said operating member and adapted to be actuated thereby, an adjustable fulcrum adapted to be engaged by said operating member, a hydraulically operated thermal motor adapted to engage said operating member intermediate the pivoted end of said member and the point of contact of said adjustable fulcrum, movement of said thermal motor in response to temperature changes producing a pivotal movement of said operating member about said pivot end until said member engages said fulcrum and thereafter causing said member to pivot about said fulcrum to actuate said control means, and means for adjusting the position of said fulcrum relative to said operating member so that the temperature at which said control means are actuated may be regulated.

16. In a control device, a resilient operating member pivotally mounted at one end and having its opposite end free to move and being constrained intermediate said pivoted end and said free end by two fulcrums laterally spaced from each other, means for moving one of said fulcrums, pivotally mounted elastic means bearing on said free end of said operating member and arranged to subject said operating member to a force to cause the unconstrained portion thereof to move quickly and with a snap action between two limiting positions, said snap action movement occurring upon a predetermined movement of said one fulcrum by said means for moving it.

17. In a control device, a resilient operating member pivotally mounted at one end and having its opposite end free to move, control means associated with said free end of said operating member, actuating means adapted to engage one side of said operating member intermediate its ends, an adjusting screw adapted to engage the opposite side of said operating member intermediate said free end and the point of engagement of said actuating means and constructed and arranged to cooperate with said actuating means to constrain said operating member, pivotally mounted elastic means bearing on said free end of said resilient operating member, said elastic means being constructed and arranged to subject said operating member to a force to cause said free end thereof to move between two limiting positions quickly in response to predetermined movement of said actuating means so that said control means are actuated with a snap action.

18. In a temperature control device, a resilient operating member, means pivotally supporting one end of said member, a control element mounted on the other end of said member, a cooperating fixed control element, a pivotally mounted spring acting on the said other end of said member biasing it to carry said first control element away from said fixed control element, a diaphragm unit adapted to engage said operating member to cause movement thereof and of said first control element in response to temperature changes, and means for adjusting the position of said diaphragm unit relative to said operating member so as to produce an initial position of said other end of said control member wherein said control element carried thereby is forced into engagement with said fixed control element.

WALLACE J. ETTINGER.